United States Patent [19]
Dowty

[11] Patent Number: 5,201,427
[45] Date of Patent: Apr. 13, 1993

[54] RACK FOR STACKING AND MAINTAINING STACKED ARTICLES UNDER COMPRESSION

[75] Inventor: Alvis E. Dowty, Jonesboro, Ark.
[73] Assignee: MDR Cartage, Inc., Jonesboro, Ark.
[21] Appl. No.: 831,923
[22] Filed: Feb. 6, 1992
[51] Int. Cl.$^5$ .............................................. A47F 7/04
[52] U.S. Cl. ..................................... 211/23; 211/49.1; 211/195; 211/208
[58] Field of Search ................. 211/49.1, 23, 195, 201, 211/175, 24, 208

[56] References Cited

U.S. PATENT DOCUMENTS

| | | | |
|---|---|---|---|
| 1,133,598 | 3/1915 | Winslow . | |
| 1,307,434 | 6/1919 | Buechler | 211/24 X |
| 1,718,828 | 6/1929 | Murphy | 211/23 X |
| 2,274,165 | 2/1942 | Ritzau | 211/49.1 |
| 2,306,540 | 12/1942 | Bates | 211/23 |
| 2,623,656 | 12/1952 | Rottau | 211/49.1 X |
| 2,815,128 | 12/1957 | Kauffman | 211/24 |
| 2,872,740 | 2/1959 | Schaevitz | 211/23 X |
| 2,889,924 | 6/1959 | Paulucci | 211/49.1 X |
| 2,925,206 | 2/1960 | Hancock | 211/49.1 X |
| 3,348,698 | 11/1967 | McConnell | 211/24 |
| 3,547,253 | 12/1970 | Black | 211/23 X |
| 3,557,966 | 1/1971 | Skubic | 211/24 |
| 3,616,937 | 11/1971 | Frame et al. | 211/24 |
| 3,700,113 | 11/1972 | Hager | 211/23 |
| 3,812,974 | 5/1974 | Sylvester | 221/23 |
| 3,880,291 | 4/1975 | Sylvester | 211/24 |
| 4,136,793 | 1/1979 | Dutra, Jr. | 214/654 |
| 4,777,781 | 11/1988 | Doster | 53/527 |

FOREIGN PATENT DOCUMENTS 1376722 9/1964 France .
625600 9/1961 Italy .

Primary Examiner—David M. Purol
Attorney, Agent, or Firm—Shlesinger, Arkwright & Garvey

[57] ABSTRACT

A rack for stacking articles and maintaining stacked articles under compression for compact storage, includes upper and lower cooperating U-shaped members. The U-shaped members each include a horizontal support and a leg extending vertically from opposite ends of the horizontal support. The vertical legs of at least one of the upper and lower members cooperate with the vertical legs of the other of the upper and lower members for vertical adjustment of the upper member relative to the lower member. A device is provided for locking the upper and lower members from relative movement with each other, subsequent to adjustment of the upper and lower members.

15 Claims, 4 Drawing Sheets

RACK FOR STACKING AND MAINTAINING STACKED ARTICLES UNDER COMPRESSION

FIELD OF THE INVENTION

The present invention relates generally to a rack for packing and shipping, in economical form, a plurality of articles and more particularly, concerns a tire compression rack for shipping and storing stacked tires under compression for compact storage.

BACKGROUND OF THE INVENTION

A plurality of storage racks for automotive and vehicular pneumatic tires are available which store the tires in their upright position. While the upright arrangement of tires provides random access to the plurality of tires stored thereon, the amount of space required to store tires in this manner is not economical for packing and shipping purposes. Accordingly, racks used for displaying articles or tires are not efficient for packing tires within a rectangular container, such as a trailer, for shipment and distributing manufactured tires to retailers.

In addition, racks are known which store tires while stacked in their horizontal position or in the so-called stovepiped formation. Some of these racks may have a load supporting platform which is adjustable depending upon the number of tires to be stacked thereon. Like other known tire display racks, racks for storing tires horizontally can be stacked on top of one another to increase the number of tires stored on a floor area. However, this upward extension of stored tires is limited by the height of the room or container and the size of the stackable rack.

Known storage racks for horizontally or vertically stored tires may include a cable or other means to secure tires stacked on a rack's platform. However, conventional securing means are threaded through upright tires or tied across horizontal tires and, at most, only restrain the tires from moving during shipment. As a result, conventional securing means are not constructed to maintain tires under compression for compact storage and thus, do not enable more tires to be shipped per container volume.

The typical form employed for shipping such tires is a rick, created by stacking alternate rows of tires within a shipping container; each row of tires is placed at a substantially acute angle; successive rows are placed at alternating angles, creating an interleaved and interlocking effect. The number of resultant stacked tires is greater than that achieved by upright or horizontal stacking and would appear as a very large herringbone pattern from the side of the shipping container.

In addition to increasing the amount of tires per container volume, the interlocking effect of the herringbone rick construction provides generally high friction between adjacent tires which tends to restrain the tires from shifting, even though the overall density of a tire shipment is low in relation to the enclosed air space.

U.S. Pat. No. 4,777,781 to Doster et al. describes an apparatus for creating high density tire ricks in order to increase the number of tires shipped per container. However with Doster's apparatus, the tires must be stacked manually within a trailer or other shipping container and then, employing a specially constructed warehouse tug vertically compressed to a volume approximately one-half of that ordinarily required. While the warehouse tug continues to hold the previously stacked tires down with a vertical wedge, workers stack additional tires above the wedge platform. After tires have been manually stacked to the roof of the container, the compressing wedge is removed and the resultant stacks can be compressed again. While Doster's apparatus increases the volumetric efficiency of a shipping container, several disadvantages are associated therewith.

In particular, the tires must be handled a number of times. First by the workers who are forced to work within the confines of trailer or other shipping container and then by the single-job dedicated warehouse tug. This alternation continues until tires can no longer be manually stacked or compressed to fit additional tires thereon. This dual process continues to form rows of stacked tire ricks until the container is filled.

Consequently, not only is Doster's specially constructed apparatus an expensive investment, it is a limited investment as it's sole use is for compressing articles stacked in their shipping container. Further, workers performing the manual stacking become extremely hot and sweaty laboring within such shipping containers. Moreover, for an efficient operation, only half of the stacked tires would be compressed. Accordingly, the increased density is limited to number of tires actually compressed since compression is limited to 50% in vertical height to avoid seriously deforming or damaging the tires.

Therefore, it can be seen that there is a need for a rack for stacking and maintaining stacked articles under compression for compact storage which allows workers to load the articles or tires outside or within a large warehouse and compresses, in one motion, all of the stacked articles or tires for efficient high density packing of articles for shipment.

OBJECTS AND SUMMARY OF THE INVENTION

A principle object of the invention is to provide an inexpensive rack for shipping and storing articles which eliminates the need to handle the articles two or three times.

It is an associated object to provide a rack for shipping and maintaining stacked articles under compression for compact storage which permits easy loading and increased density of tires to be shipped.

A related object of the present invention is to provide a rack with adjustable sidewalls so that a large number of articles can be stacked within the rack which can then be compressed enabling more articles or tires to be shipped in a particular sized container.

Yet another object of the invention is to provide a tire rack having an adjustable depth and width, as well as its height, so that the rack can be adjusted to fit the width and depth of a trailer or other container. Accordingly, the rack is designed so that it can be used in any size trailer, boxcar, ocean car, piggyback trailer, etc.

The above objects are achieved by the rack according to the invention which includes upper and lower cooperating U-shaped members which each include a horizontal support and a leg extending vertically from opposite ends of its horizontal support, the vertical legs of at least one of the upper and lower members cooperating with the vertical legs of the other for vertical adjustment of the upper member relative to the lower member; and means for locking the upper and lower members from relative movement with each other, subsequent to adjustment of the upper and lower members.

A feature of the above invention is that the rack includes an upper cover member which can be moved up and down to compress articles or tires received therein to adjust pressure on the tires. Thus, the rack according to the invention can compress articles for shipping at maximum weight or for holding them in the rack in storage.

It is another feature of the invention that the tire compression rack can store tires in both the ricked or stovepiped formation which results in significant cost savings in overall shipment costs of manufactured tires due to the increased volumetric efficiency of the shipped rack.

Similarly, a further feature of the invention is that the racks themselves can be shipped while storing the tires under compression. Thus, once the tires are stacked in a rack according to the invention, the tires themselves need not be handled until after the racks reached their final destination.

Yet another feature of the invention is that a plurality of tire compression racks can be purchased for the cost of a single-job dedicated warehouse tug. Furthermore, more tires can be stacked within a container using the racks according to the invention than with Doster's specially constructed warehouse tug.

BRIEF DESCRIPTION OF THE DRAWINGS

Other objects, features and advantages of the invention and a better understanding of its construction and operation will become apparent from the following description, taken in conjunction with the accompanying drawings in which.

DESCRIPTION OF THE PREFERRED EMBODIMENT

While the invention will be described below in connection with a rack for stacking and compressing pneumatic tires, one skilled in the art will appreciate that the invention is not necessarily limited to that embodiment.

Figure 1:
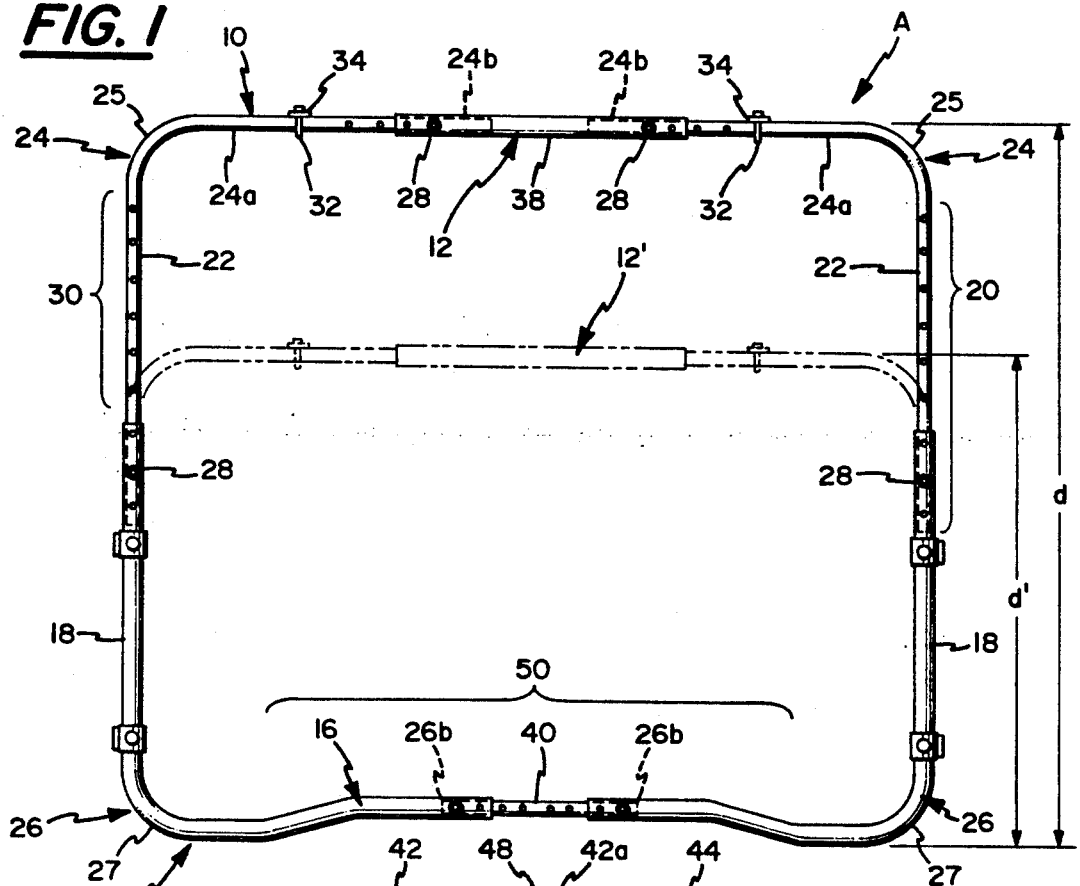
FIG. 1 is a front elevational view of a rack according to the invention showing the compressed upper member in phantom.
Figure 2:
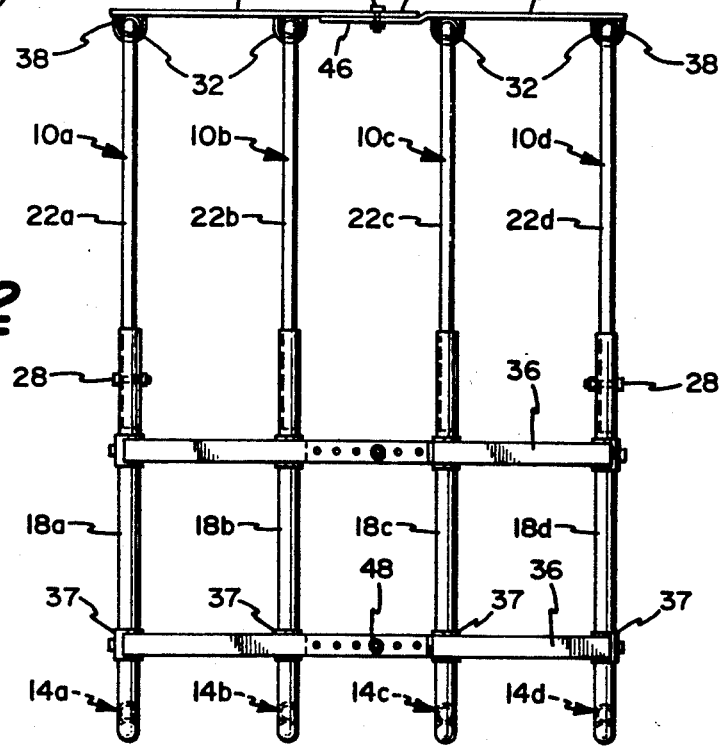
FIG. 2 is a side elevational view of a rack according to the invention.

Referring to FIGS. 1 and 2, the general arrangement of a rack A according to the invention may be seen to include an upper member 10 having a horizontal cover or support 12 which cooperates with a lower U-shaped member 14 having a horizontal support 16 and sidewalls or vertical legs 18, and means 20 for locking upper and lower members 10, 14 from relative movement with each other subsequent to adjustment of a vertical distance d between horizontal supports 12, 16. The cooperation between upper and lower members 10, 14 provides for increasing and decreasing the vertical distance d, d' between upper and lower horizontal supports 12, 16.

Lower vertical legs 18 define the width of rack A and thus the number of articles being stacked in a row across lower horizontal support 16. Similarly, the initial vertical distance d between upper and lower horizontal supports 12, 16 determines the number of tires stacked in a column formed in rack A. The width (see FIG. 3) and depth (see FIG. 5) of upper and lower members 10, 12 are designed in accordance with the size of the articles or pneumatic tires to be stacked within rack A. Moreover, each horizontal support 12, 16 may be laterally adjustable for increasing and decreasing the width.

In a preferred embodiment, both upper and lower members 10, 14 are formed in the shape of a U. Thus, a leg 22 extends vertically from opposite ends of horizontal support 12 forming sidewalls and defining a resultant sidewall with legs 18 of lower member 14. The vertical legs 22 of upper member 10 cooperate with vertical legs 18 and are preferably in telescoping interrelationship with one another.

Figure 3:
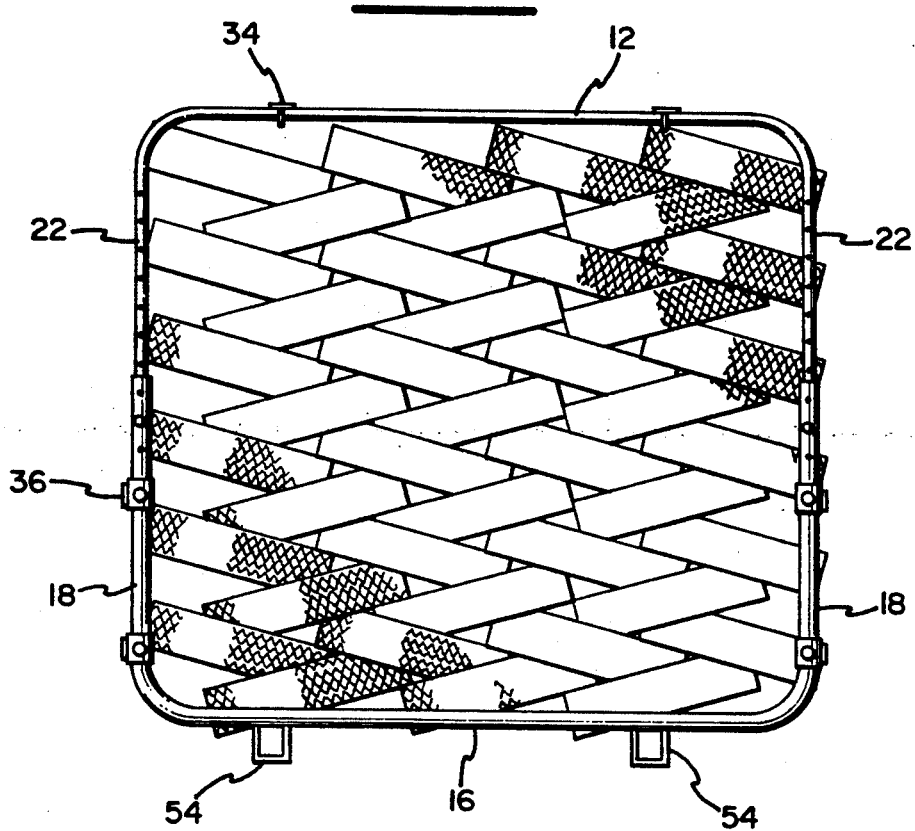
FIGS. 3 and 4 illustrate a rack according to the invention with ricked tires in the initial loaded position and the compressed position, respectively.
Figure 4:
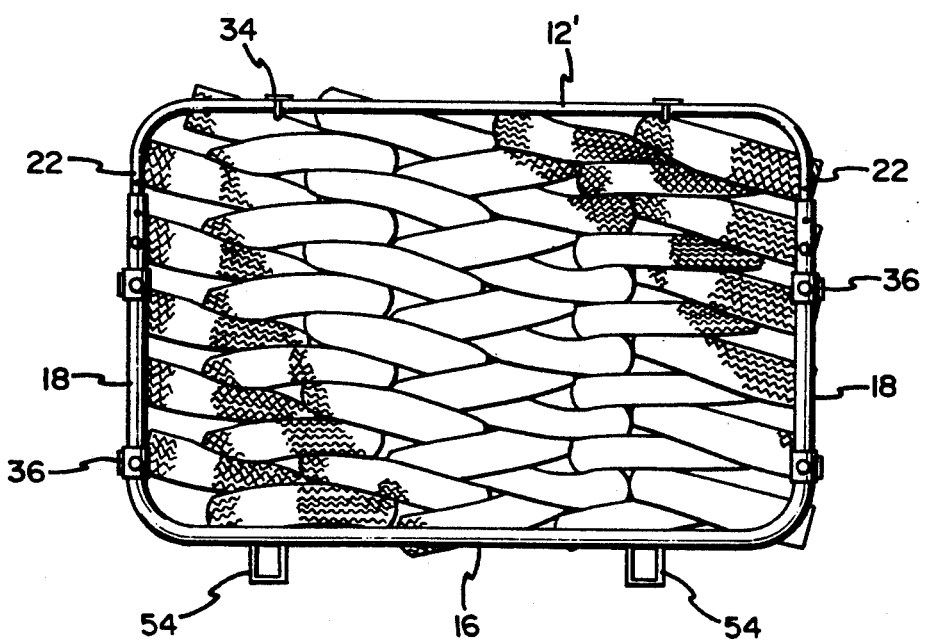

As a result of this construction, upper horizontal support 12 can be locked in a first position so that the resultant sidewalls of rack A have a height corresponding to vertical distance d for receiving a plurality of articles or pneumatic tires (see FIG. 3). Upon disengagement of locking means 20, the height of resultant sidewalls 18, 22 can be shortened to vertical distance d' thereby causing horizontal supports 12', 16 to compress tires stacked within rack A. Locking means 20 are reengaged precluding relative movement and maintaining the stacked tires under compression for compact storage. (see FIG. 4).

As shown in FIG. 2, upper and lower members 10, 14 each may include a plurality of spaced-apart frame members 10a–d, 14a–d. Respective ones of these frame members are rigidly interjoined together to form a respective U-shaped member 10, 14 and the number of frame members interjoined determines the depth of the resultant member (rack).

At least a portion of a horizontal section 12, 16 and a respective upright section of frame members 10a–d, 14a–d are preferably made of one piece construction and may be tubular in nature. As shown in FIG. 1, frame members 10a–d, 14a–d can be formed out of two L-shaped parts 24, 26 having horizontal sections 24a, 26a which correspond to portions of a respective horizontal support 12, 16 and are integrated with respective vertical legs 22, 18. The entire length of L-shaped parts 24, 26 can be of one-piece tubular construction so that respective outer ends of vertical legs 22, 18 of upper and lower members 10, 14 are in telescoping interrelationship with one another L-shaped parts 24, 26 include extension-free corners 25, 27 respectively, which may be substantially rounded, as shown.

In a preferred embodiment, locking means 20 may include fastening means, such as conventional nuts and bolts 28, which cooperate with a series of holes 30 formed through vertical legs 18, 22. The bolts 28 extend through corresponding selected holes of respective vertical legs 18, 22 to hold upper members 10, 14 against relative movement and to define a height of rack A. Almost the entire length of vertical legs 22 of upper member 10 can be provided with a series of holes therethrough. The number of and spacing between the series of holes 30 formed through vertical legs 22 determine the various pressure adjustments which can be made for compacting articles to be stored within rack A. Additionally, lower vertical legs 18 may be provided with a smaller amount (e.g., three) of holes to increase the number of pressure adjustments. Each series of holes 30 on a respective vertical leg 18, 22 corresponds in spacing to the series of holes 30 form on the other respective vertical leg. The spacing between each adjacent hole can be equidistant or varied depending on the desired variations in pressure.

While manual fastening means, operative with a series of holes, are illustrated, other types of conventional securing devices can be employed as will be apparent to those skilled in the art. For example, automatic locking and releasing spring devices can be attached to one of lower and upper vertical legs 18, 22 which engage with holes or recesses formed in the other of vertical legs 18, 22. Accordingly, the compression operation can be achieved easily and automatically by forcing upper horizontal support 12 against a roof or other vertical support.

In order to temporarily secure frame members 10a-d together, each horizontal section of the plurality of frame members 10a-d is passed through a coupling bracket 32 securedly attached to a plate means 34. Coupling brackets 32 may be welded to plate means 34 at predetermined spaced-intervals so that horizontal sections of frame members 10a-d provide the necessary support or compression when articles or tires are stored within the rack.

In a preferred embodiment, plate means 34 has a flat upper surface so that racks A can be easily stacked one on top of the other within a shipping container. Additionally, the number of plate means 34 employed to couple frame members together depends upon the width of the horizontal supports or rack A. In the illustrated embodiment, each frame member 10a-d has two L-shaped parts 24 and a plate means 34 is disposed substantially perpendicular to the horizontal section 24a of each L-shaped frame part 24.

Likewise, plate means 36 can be disposed across upright sections 18a-d of resultant lower member 14 to securely attached frame members 14a-d together to form lower frame member 14. Preferably, plate means 36 includes a number of tubes 37 which are slidably mounted and secured to appropriate portions of upright sections 18a-d. Tubes 37 are welded to plate means 36 at predetermined spaced intervals based on the size of articles to be stacked on lower member 14.

In a preferred embodiment, an extension tube 38, 40 may be placed between L-shaped parts 24, 26 of upper and lower members 10, 14 for adjusting the width of the resultant formed horizontal support 12, 16. Preferably, extension tubes 38, 40 are in telescoping interrelationship with inner ends 24b, 26b of L-shaped parts 24, 26.

Upper extension tube 38 cooperates with horizontal inner ends 24b of each L-shaped part 24 of a respective frame member 10a-d and preferably is of a diameter greater than that of inner ends 24b. Similarly, lower extension tube 40 cooperates with horizontal inner ends 26b of each L-shaped part 26 of a respective lower frame member 14a-d. However, the diameter of lower extension tube 40 should be smaller than that of inner ends 26a so that extension tube 40 does not interfere with the surface of lower horizontal support 16.

Similar to locking means 20, extension tubes 38, 40 can be formed with a series of holes drilled therethrough which can be lined up with a plurality of holes formed in inner ends 24b, 26b of respective L-shaped parts 24, 26. When the desired width is achieved, fastening means, such as conventional bolts and nuts 28, can be passed through the aligned holes at both ends of extension tube 38, 40 to secure the telescoping inner ends 24b, 26b to a respective extension tube 38, 40. As will be apparent to those skilled in the art, other known extension and locking devices can be employed.

Likewise, if the number of frame members provides sufficient support, the depth of a resultant rack A can be adjusted. In an embodiment having four frame members, this can be achieved, as shown in FIG. 2, by modifying plate means 34, 36 to include a first horizontal plate 42 with two coupling brackets 32 (or tubes 37) secured thereto and an extension 42a having a series of holes and, a second horizontal plate 44 with coupling brackets 32 (or tubes 37) secured thereto. A plate flange 46 with a plurality of holes extends from second plate 44 in a plane lower and parallel to second plate 44. Accordingly, horizontal plate extension 42a can rest against plate flange 46 and be flush with second plate 44. While described with reference to plate means 34, lower plate means 36 can have similar structure. With this feature, the length of plate means 34, 36 and the depth of rack A can be varied by aligning holes and then securing first horizontal plate 42 to plate flange 46 via fastening means 48.

OPERATION

The operation of a stacking and compressing rack A according to the invention may be understood upon reference to FIGS. 3–6 which illustrate tire stacking formations and a vehicle for raising and lowering, as well as positioning, a rack A.

Figure 5:
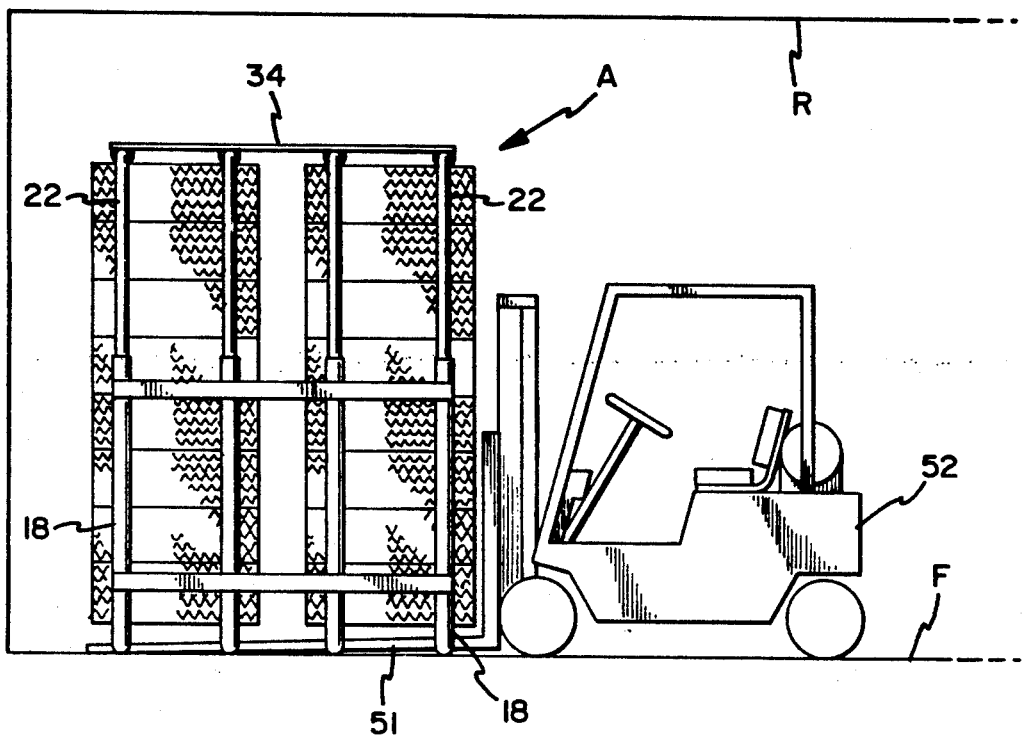
FIG. 5 is a side view of a rack according to the invention containing stovepiped tires as installed upon a standard forklift truck for moving the rack about an area.
Figure 6:
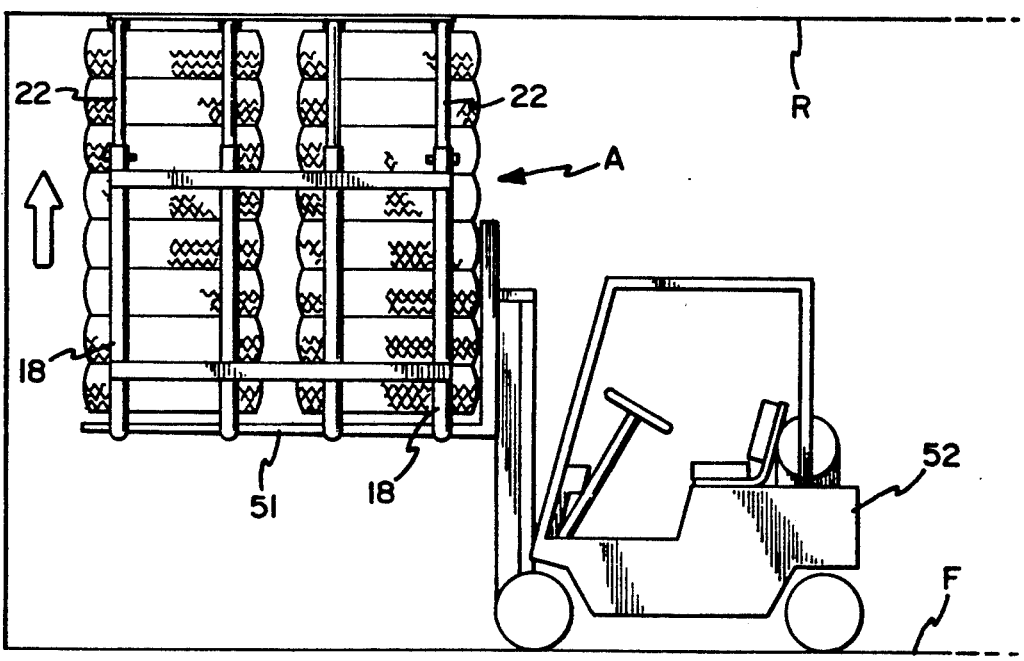
FIG. 6 is a side view of a rack shown in FIG. 5, depicting the vertical motion of the forklift for compressing the stovepiped tires.

Tires can be stacked on a horizontal support 16 in either a rick formation (see FIG. 3) or the stovepiped formation as shown in FIG. 5. Initially, these tires are manually ricked or stovepiped within a rack A. However, unlike conventional stacking and compressing systems, the stacking can take place anywhere (e.g., in a large warehouse or outside on the dock) due to the portability of rack A.

As shown in FIG. 1, lower horizontal support 16 may be formed with a raised portion or recess 50 for receiving tines 51 of a standard forklift truck 52. The raised portion or recess 50 inexpensively provides a method of installing rack A on a vehicle 50 without interfering with the stacking of articles with a rack A or with the stacking of the racks themselves.

In another embodiment, shoes 54 can be secured to the bottom of horizontal support 16. Shoes 54 are spaced from one another corresponding to the distance between the tines 51 of a standard forklift truck 52. Alternatively, handles 58 can be secured to sides 18 of lower member 14 of rack A'. However, this embodiment requires a special forklift 60 having lugs 62 which project through handles 58 to lift and move rack A'.

Once a rack A is stacked with tires, the tines 51 of a standard forklift truck 52 can be inserted underneath recess 52 (see FIG. 5) or within shoes 54 to lift rack A above the floor F. One lifted off the floor, rack A (and thus, the stacked tires) can be carried anywhere accessible by truck 52. Accordingly, a rack A containing manually stacked tires can be moved to an area having a vertical support or roof R which is slightly greater than vertical distance d. Once the initially loaded rack is situated under a vertical support or roof R of the appropriate height, locking means 20 is disengaged. Then, as illustrated in FIG. 8, tines 51 of standard forklift truck 52 can be raised forcing plate means 34 of upper horizontal support 12 against roof R thereby causing vertical legs 22 to be pushed inside vertical legs 18 shortening the resultant sidewalls of rack A and compressing the tires stacked therein. Once the desired level of compression is reached, the appropriate locking means 20 secures vertical legs 18, 22 from moving at the second height and keeps the stacked articles or tires under compression for compact storage and shipping purposes.

While the compression operation has been described as raising a rack A against an upper vertical support, if shoes 54 or handles 58 are disposed on upper member 10, rack A could be pressed against a floor or other lower vertical support to cause relative movement between upper and lower U-shaped members.

Moreover, once appropriate locking means 20 are in place, a rack according to the invention forms a compressed bundle of stacked articles. As a result, only rack A needs to be handled by equipment, such as standard fork lifts, during shipment. Further, the rack according to the invention can be designed to compactly bundle any number of tires so that a shipping container can be packed so that only racks need be removed when delivering tires to a manufacturer.

Figure 7:
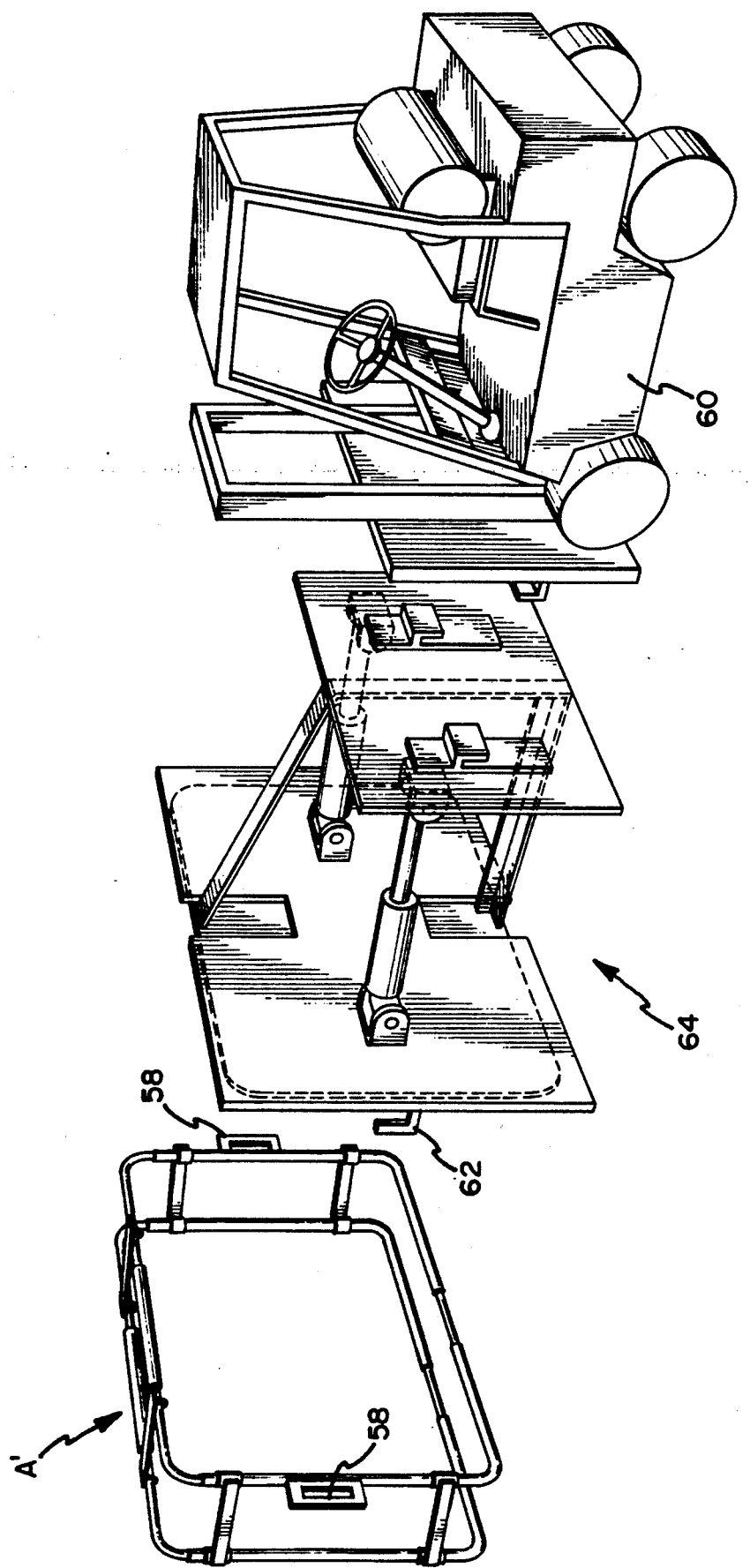
FIG. 7 is an exploded, perspective view illustrating an alternative embodiment of the invention which includes a ramming device for removing tires from a rack.

One of ordinary skill in the art will appreciate that a rack according to the invention can, if desired, be transported with its load of tires from place to place by a forklift, crane or the like. After articles which have been compactly shipped within a rack reach their final destination, the articles or tires can be removed manually or, for example, with a ramming device 64 as shown in FIG. 7.

Further, the racks, when empty, are collapsible for compact shipping and handling but can be quickly and easily assembled. In addition, the racks can be formed from inexpensive, lightweight materials, such as metal tubing, but when constructed are sturdy and withstand service usage.

While this invention has been described as having a preferred design, it is understood that it is capable of further modification, uses and/or adaptations following the general principle of the invention and including such departures from the present disclosure as come with the known or customary practice in the art to which the invention pertains and as may be applied to the central features hereinbefore set forth, and fall within the scope of the invention and of the limits of the appended claims.

I claim:

1. A rack for stacking articles and maintaining stacked articles under compression for compact storage, said rack comprising:
   a) upper and lower cooperating U-shaped members;
   b) said U-shaped members each including a horizontal support and a leg extending vertically from opposite ends of said horizontal support;
   c) said vertical legs of at least one of said upper and lower members cooperating with the vertical legs of the other of said upper and lower members for vertical adjustment of said upper member relative to said lower member;
   d) each said horizontal support includes:
      i) a plurality of spaced-apart frame members integrated with a plurality of respective upright sections corresponding to said vertical legs;
      ii) means for rigidly interjoining said plurality of frame members; and
      iii) said interjoining means including a means for adjusting its length and thus the depth of the rack, said adjusting means being disposed substantially on the exterior of said spaced-apart frame members; and
   e) means for locking said upper and lower members from relative movement with each other, subsequent to adjustment of said upper and lower members.

2. A rack according to claim 1, wherein:
   a) said horizontal support of said upper and lower members are laterally adjustable relative to each other.

3. A rack according to claim 1, wherein:
   a) each said integrated frame member and respective upright section comprises a tubular member with a free outer upright end and a horizontal section; and
   b) respective free outer upright ends of said upper and lower members are in telescoping interrelationship with one another.

4. A rack according to claim 3, wherein:
   a) said cooperating vertical legs of said upper and lower members define a width of said rack; and
   b) each one of said plurality of spaced-apart frame members has means for adjusting the width of said rack.

5. A rack according to claim 4, wherein:
   a) each said frame member of a horizontal support further has two portions, each portion having an inner end and an outer upright section; and
   b) said width adjusting means cooperates with said inner ends of each said two portion of a respective frame member.

6. A rack according to claim 5, wherein:
   a) said inner ends of respective portions of a frame member have a telescoping interrelationship; and
   b) said width adjusting means includes a tube with a series of holes which can be aligned with holes formed on said inner ends of respective portions, and fastening means for securing said tube to said telescoping inner ends of a respective frame member.

7. A rack according to claim 1, wherein:
   a) said vertical legs extending from respective ends of said upper and lower members have outer ends being in telescoping interrelationship with one another;
   b) each said outer end has a plurality of holes formed therethrough along a line; and
   c) said locking means includes fastening means, operative with said series of holes, for securing respective vertical legs together to define a height of said rack.

8. A rack according to claim 1, wherein:
   a) said means for rigidly interjoining frame members of said upper member includes plate means, disposed across said frame members of said upper horizontal support, for coupling said frame members together at spaced intervals; and
   b) said plate means has a flat upper surface.

9. A rack according to claim 1, wherein:
   a) said means for rigidly interjoining the plurality of frame members includes means for adjusting its length and thus the depth of the rack.

10. A rack according to claim 1, wherein:
    a) said horizontal support of said lower member has a recessed portion adapted for receiving tines of a standard fork lift device.

11. A rack according to claim 1, wherein:
a) said means for rigidly interjoining said frame members of said lower member includes plate means, disposed across respective upright sections on opposite sides of said lower horizontal support, for coupling and supporting said lower member frame members together and said respective upright sections.

12. A rack for stacking articles and maintaining stacked articles under compression for compact storage, said rack comprising:
a) upper and lower cooperating U-shaped members;
b) said U-shaped members each including a horizontal support and a leg extending vertically from opposite ends of said horizontal support;
c) said vertical legs of at least one of said upper and lower members cooperating with the vertical legs of the other of said upper and lower members for vertical adjustment of said upper member relative to said lower member;
d) each said horizontal support includes:
 i) a plurality of spaced-apart frame members integrated with a plurality of respective upright sections corresponding to said vertical legs;
 ii) means for rigidly interjoining said plurality of frame members; and
 iii) said interjoining means including at least one lower means for adjusting the distance between adjacent ones of said spaced apart frame members disposed on said lower members and at least one upper means for adjusting the distance between adjacent ones of said spaced apart frame members disposed on said upper members; and
 iv) one of said at least one lower means being disposed on said vertical legs of said lower members for rigidifying said adjacent ones of said spaced apart frame members.
e) means for locking said upper and lower members from relative movement with each other, subsequent to adjustment of said upper and lower members.

13. A rack according to claim 12, wherein:
a) said interjoining means is disposed substantially on the exterior of said spaced-apart frame members.

14. A rack for stacking articles and maintaining stacked articles under compression for compact storage, said rack comprising:
a) upper and lower cooperating U-shaped members;
b) said U-shaped members each including a horizontal support and a leg extending vertically from opposite ends of said horizontal support;
c) said U-shaped members each including two spaced opposed corners;
d) each of said corners being substantially extension-free;
e) said vertical legs of at least one of said upper and lower members cooperating with the vertical legs of the other of said upper and lower members for vertical adjustment of said upper member relative to said lower member; and
f) means for locking said upper and lower members from relative movement with each other, subsequent to adjustment of said upper and lower members.

15. A rack according to claim 14, wherein:
a) each of said corners is substantially rounded.

* * * * *